US007702108B2

(12) United States Patent

Amon et al.

(10) Patent No.: US 7,702,108 B2

(45) Date of Patent: Apr. 20, 2010

(54) USE OF COMMUNICATION EQUIPMENT AND METHOD FOR AUTHENTICATING AN ITEM, UNIT AND SYSTEM FOR AUTHENTICATING ITEMS, AND AUTHENTICATING DEVICE

(75) Inventors: Maurice A. Amon, Gstaad (BE); Anton Bleikolm, Ecublens (CH); Olivier Rozumek, St. Martin (CH); Edgar Müller, Fribourg (CH); Olivier Brémond, Prilly (CH)

(73) Assignee: SICPA Holding S.A., Prilly (CH)

( * ) Notice: Subject to any disclaimer, the term of this patent is extended or adjusted under 35 U.S.C. 154(b) by 1124 days.

(21) Appl. No.: 10/276,335

(22) PCT Filed: Jun. 22, 2001

(86) PCT No.: PCT/EP01/07111

§ 371 (c)(1),
(2), (4) Date: Nov. 27, 2002

(87) PCT Pub. No.: WO02/01512

PCT Pub. Date: Jan. 3, 2002

(65) Prior Publication Data

US 2003/0136837 A1 Jul. 24, 2003

(30) Foreign Application Priority Data

Jun. 28, 2000 (EP) ................................ 00113670

(51) Int. Cl.
*H04L 9/32* (2006.01)
*H04L 9/36* (2006.01)
*H04L 9/14* (2006.01)

(52) U.S. Cl. ...................... 380/270; 380/247; 380/249; 713/161

(58) Field of Classification Search .................. 705/56, 705/58; 713/183, 176, 179, 175, 500–503, 713/161; 380/247, 54, 51, 27, 270, 249
See application file for complete search history.

(56) References Cited

U.S. PATENT DOCUMENTS

| | | | | |
|---|---|---|---|---|
| 4,064,389 | A * | 12/1977 | Patterson | 235/431 |
| 5,543,988 | A | 8/1996 | Brady et al. | |
| 5,552,589 | A | 9/1996 | Smith et al. | |
| 5,629,981 | A * | 5/1997 | Nerlikar | 713/168 |
| 5,895,073 | A | 4/1999 | Moore | |
| 6,397,261 | B1 * | 5/2002 | Eldridge et al. | 713/171 |
| 6,789,191 | B1 * | 9/2004 | Lapstun et al. | 713/168 |

(Continued)

FOREIGN PATENT DOCUMENTS

DE 4318983 6/1993

(Continued)

*Primary Examiner*—Jung Kim
*Assistant Examiner*—Venkat Perungavoor
(74) *Attorney, Agent, or Firm*—Shoemaker and Mattare

(57) ABSTRACT

The present invention relates to a method and a system for the local or remote authentication of an item, in particular a security document, with the help of a authenticating device, comprised in, connected to, or linked to mobile communication equipment. Said item carries a marking exhibiting a characteristic physical behavior in response to interrogating energy, such as electromagnetic radiation and/or electric or magnetic fields. Said marking may comprise physical and logical security elements, e.g. a barcode, or a characteristic particle or flake pattern, exhibiting a characteristic physical response.

3 Claims, 5 Drawing Sheets

U.S. PATENT DOCUMENTS 7,162,035 B1 * 1/2007 Durst et al. .................. 380/54

FOREIGN PATENT DOCUMENTS

| | | |
|---|---|---|
| DE | 19638882 | 4/1998 |
| DE | 19734855 | 2/1999 |
| DE | 10010514 | 3/2000 |
| DE | 20003253 | 8/2000 |
| DE | 10107344 | 10/2001 |
| EP | 0975132 | 1/2000 |
| JP | 02-230244 | 9/1990 |
| RU | 2165359 | 4/2001 |
| WO | 96/30879 | 10/1996 |
| WO | WO 9949640 | 9/1999 |
| WO | WO 9951007 | 10/1999 |
| WO | 00/05688 | 2/2000 |
| WO | WO 0031679 | 6/2000 |

* cited by examiner

USE OF COMMUNICATION EQUIPMENT AND METHOD FOR AUTHENTICATING AN ITEM, UNIT AND SYSTEM FOR AUTHENTICATING ITEMS, AND AUTHENTICATING DEVICE

FIELD OF INVENTION

The invention is in the field of the authentication of items, specifically of documents, in particular of security documents. It concerns a particular use of communication equipment, a method and a unit for authenticating items in accordance with the independent claims.

Items to be authenticated, in particular security documents, are provided with specific security features or markings which are difficult to obtain or to produce, in order to confer the item resistance against counterfeiting. Said security features or markings can have particular physical or chemical properties, such as to allow their interrogation with the help of corresponding detecting equipment. Such properties include: particular spectral absorption features in the optical range (200 nm-2500 nm wavelength) of the electromagnetic spectrum; luminescence (fluorescence, phosphorescence) in the UV-visible-IR range; mid-, long-, and Very-Far-IR absorption (2.5 μm-1 mm wavelength); microwave and radio-frequency resonance; as well as particular magnetic and dielectric properties. Said security markings can furthermore be designed to carry information, which may be coded or not. The meaning of these terms is known to the skilled in the art.

Said security features or markings can be part of the item itself (e.g. ingredients of a security paper or molded into the plastic of a card), or affixed to it via foils, inks, toners or coatings. Particularly interesting in the context of the present invention are ink-based security features, which are applied to the item via a printing process, such as intaglio-, letterpress-, offset-, screen-, gravure-, flexographic, ink-jet, or solid-ink printing. The security feature can also be contained in an electrostatic or magnetic toner composition, and applied to the document by laser printing. Alternatively, the security feature can be contained in a protective over-coating composition, applied to the security article via any of the known coating techniques.

Security features on items, in particular on security documents, are actually exploited by the issuing authorities and their legal representatives. E.g. emitted currency is regularly recycled and processed by the central banks which the help of specialized high-speed sorting and authenticating equipment; passports, driving licenses and identity documents are checked by the police and the custom authorities; credit cards, access cards and valued papers are checked by forensic services in the case of forgery suspicion; and branded goods are checked by the commissioners of the brand owner with the help of particularly designed detecting equipment.

The "man in the street" must generally rely on his five senses to authenticate an item, based on the article's overt security features, such as the tactility and the perfect register of an intaglio printing, the stiffness of banknote paper, the color shift of an optically variable ink, etc. . . . A deeper examination can be performed with the help of simple technical means, such as a portable UV light source.

There is, however, in some cases a need for field-checking the authenticity of determined items at a security level such as would normally only be available at an issuing authority's or a brand owner's facility. Such need arises particularly in the domains of branded goods and custom issues, where brand owner's or state's commissioners must check the authenticity of brand labels, tax marks, banderoles etc. No simple and versatile technical solution exists to solve this task.

OBJECT OF THE INVENTION

It is an object of the present invention to provide a method and corresponding equipment for the field authentication of items, in particular security documents, at advanced security levels with the help of state-of-the-art technical communication means. Said method and equipment are easy and almost everywhere to use, versatile, highly reliable and compatible with proven technical standards.

DESCRIPTION OF THE INVENTION

The invention, schematically depicted in FIG. 1, is based on the idea to use widely distributed mobile communication equipment for authenticating and tracking security products.

The mobile terminal is a component of a global system, it interacts with any kind of authenticity data captors and communicates with a remote server in a user-friendly and secure way (e.g. using a WAP protocol).

The authenticity data captors (detectors) are connected to the mobile terminal using either a:

- wire plug to a port,
- short range radio link (e.g. Bluetooth or other low-power radio technology)
- short range infrared link (e.g. IrDA technology).

The mobile terminal receives a numerical signal from the authenticity data captor (authenticating device), the latter may hereby be either:

- an electromagnetic radiation detector,
- a scanner (for visible or invisible barcodes or marks),
- a CCD or CMOS camera,
- a magnetic property detector,
- etc. . . .

The authentication of an item is stand-alone and achieved by the infrastructure of the mobile terminal which supports smart-card (e.g. Java Card) based applications. The authentication programs which process the signals of the data captor, which may be e.g. a scanner or a camera, may be downloaded from a remote server.

The tracking and data retrieval of an item is achieved with the help of a remote server and initiated from the mobile terminal. The mobile terminal receives numerical data from the captor device, pre-treats this data if necessary, and then either performs a local authentication operation, using downloaded program and reference data, or, alternatively, sends the captor data to a central server for remote authentication or tracking. The invention is thus based on the idea to use generally available mobile communication equipment, such as mobile phones or handheld computers, electronic organizers, etc., which are provided with access to a mobile wide area telephone network (WAN), as the interrogating means for authenticating items, in particular security documents. The authenticating device is hereby either integrated into the communication equipment, such that the user does not need to carry with himself additional pieces of equipment for authenticating said item, or contained in a hardware accessory to the communication equipment. In the latter case, the hardware accessory may be linked to the communication equipment either by wire, or by a radio (microwave) link, or by an optical (infrared) link.

An aspect of the invention consists therefore in using at least one existing capability of mobile communication equipment for authenticating an item, in particular a security document, in conjunction with an authenticating device comprised in said communication equipment or connected to it. Said capability refers noteworthy to the mobile communication equipment's data processing and storage capabilities, its data transfer capabilities, its user-interface capabilities, its machine interface capabilities, as well as its power supply. According to the invention, at least one element of this group is functionally connectable with an authenticating device.

Mobile phones and other communication equipment comprise noteworthy on-board data processing and storage components; said components are implemented in part as the equipment's fixed hardware, and in part as exchangeable modules, such as SIM or Java cards, or the like.

Mobile phones and other communication equipment are furthermore equipped with communication hardware and corresponding software to support data transfer via the mobile phone's intrinsic communication capability over a mobile telephone network (WAN), which enables the phone to establish a link with a remote server and to exchange data with it. Useful data transfer standards include:

GSM (Global System for Mobile communications) 9.6 kb/s

EDGE (Enhanced Data rate for GSM Evolution) up to 120 kb/s

GPRS (Global Packet Radio System) between 53.4 and 144 kb/s

UMTS (Universal Mobile Telecommunications System) 384 kb/s, in building 2 Mb/s.

Mobile phones and other communication equipment have also user-interface capabilities, enabling the equipment to receive instructions via a keyboard input, to display visual information via a display panel, to capture sound via a microphone, and to display sound via a loudspeaker.

Mobile phones and other communication equipment have finally machine-interface capabilities, enabling the communication equipment to exchange data with other equipment via a wire connector, or via a local-area-network (LAN) using a radio-link or an optical (infrared, IrDA) link.

In order to interact with the authenticating device of the communication equipment, the items comprise corresponding markings. In particular, said markings may be printed features or coatings which absorb and/or transform energy provided by the authenticating device of the communication equipment. The authenticating device is enabled to detect the response of the marking to interrogation and/or to read the information contained in the marking.

Said response of the marking, which serves for its authentication, is noteworthy and in first instance a physical characteristics, such as a spectrally selective absorption of electromagnetic radiation, or a spectrally selective emission of electromagnetic radiation in response to an energy supply, or another measurable electric or magnetic characteristics, etc. In second instance the marking can also carry information, embodied by said physical characteristics, and readable accordingly. Said information can either be represented by a particular local distribution, random or deterministic, of said physical characteristics on the item carrying the marking (localized information storage), or by a particular combination of said physical characteristics with further physical characteristics (non-localized information storage), or by a combination of both.

Said markings may noteworthy comprise a particle or flake material, being printed such as to result in a characteristic, random local particle or flake distribution pattern over a given surface area, which can be read and authenticated by the authenticating device, and which confers the item a particular identity.

Detection of response signals issued by said marking on said item and/or reading of the local and/or non-local information contained in said marking is carried out by the authenticating device comprised in, connected to, or linked to the communication equipment and/or, in the case of a visible electromagnetic radiation response, also by the blank eye.

According to an important aspect of the invention, the intrinsic capabilities of communication equipment are used for authenticating said marking on said item. Communication equipment has noteworthy the capability of on-board data processing and storage and the capability of communicating, i.e. exchanging data with remote data processing and storage facilities. It has furthermore at least two types of user interfaces, allowing for data input by the user, and for data output by the communication equipment.

According to an embodiment of the invention, the on-board data processing and storage capability of the communication equipment is used to perform the authenticating function locally, i.e. to authenticate the item, based on signals or data furnished by the authenticating device.

Said data processing and storage capability is hereby used to support an authenticating algorithm, which may be contained in a memory device of the communication equipment, such as a Java card. Said authenticating algorithm may hereby either be physically loaded into the communication equipment in the form of a solid-state device containing it, or alternatively be downloaded from a server via a telephone link. The result of the locally performed authenticating operation is subsequently displayed by the communication equipment, or, alternatively, by the authenticating device externally connected or linked to it.

According to a second variant of the invention, the communicating capability of the communication equipment is used to perform the authenticating function at a remote place. Signals or data furnished by the authenticating device are transmitted, after appropriate pre-processing, by the communication equipment to a remote server comprising memory, a reference data base, a processor, as well as said authenticating algorithm. The result of the authenticating operation is transmitted back to the communication equipment, where it is subsequently displayed, either by the communication equipment, or, alternatively, by the authenticating device externally connected or linked to it.

Accordingly, the invention provides a method for the authentication of an item, in particular a security document, carrying at least one marking, with the help of a mobile communication device coupled to an authenticating device, said method comprising the steps of:

(a) optionally exposing the marking to activation or interrogating energy, i.e. electromagnetic radiation and/or electric or magnetic fields produced or used by said authenticating device comprised in, or connected to, or linked to said communication device;

(b) detecting, with the help of a detector comprised in said authenticating device, an authenticating signal, i.e. electromagnetic radiation and/or electric or magnetic characteristics produced by the marking in response to said interrogating energy;

(c) authenticating said detected response signal in said communication device, preferably using the data processing and storage hardware of the device, combined with a specifically designed authenticating algorithm implemented on said data processing hardware.

In a first embodiment of the method, the mobile communication device's hardware's processing and data storage means are used to perform said authentication locally, whereby at least part of said authenticating algorithm may be either downloaded into the communication device via a telephone link, or, alternatively, inserted into it in the form of a memory chip, a Java-card, etc. . . . Said method comprises thus the steps of:

(i) optionally downloading a measuring and/or authenticating algorithm from a remote server or a data base into the memory of said mobile communication device;
(ii) downloading of reference data from a remote server into the memory of said mobile communication device;
(iii) producing said authenticity signal according to a measuring algorithm, using said authenticating device;
(iv) authenticating said authenticity signal by the means of said mobile communication device, using an authenticating algorithm and said reference data, thereby producing an authentication result;
(v) generating an output signal representative of said authentication result.

In a second embodiment of the method, the mobile communication device transmits the data via a telephone link to a remote server for remote authentication, and receives back the authentication result. However, even in this case, the mobile communication equipment performs part of the data processing locally, which may comprise data compressing, data modeling, and data encryption (encoding/decoding). Said method comprises thus the steps of:

(i) optionally downloading a measuring algorithm from a remote server into the memory of said mobile communication device;
(ii) producing said authenticity signal according to a measuring algorithm, using said authenticating device;
(iii) uploading the authenticity signal of step (ii) to a remote server;
(iv) authenticating said authenticity signal on said remote server, using a corresponding authenticating algorithm and corresponding reference data, thereby producing an authentication result;
(v) preferably downloading the authentication result of step (iv) from the remote server to the mobile communication device;
(vi) generating an output signal representative of said authentication result.

The downloading and/or uploading of information between said communication device and said remote server is preferably performed using a secure, encrypted connection. A secure connection, as known to the skilled in the art, can be realized based on the "Rivest, Shamir, Adleman" (RSA) algorithm.

The marking whereupon said method is applied comprises at least one security element, selected from the group consisting of magnetic materials, luminescent materials, spectrally selective absorbing materials—preferably in the infrared, radio-frequency resonant materials, microchip transponders, and particle or flake patterns.

Accordingly, the invention comprises a unit for authenticating an item, in particular a security document, having at least one marking, said marking exhibiting a characteristic physical behavior in response to activating energy, preferably electromagnetic radiation and/or electric or magnetic fields, said unit comprising:

(a) a mobile communication device having data processing and storage capabilities, data transfer capabilities, user-interface capabilities, and machine-interface capabilities,
(b) an authenticating device, coupled to said mobile communication device, said authenticating device comprising a device for producing said activating energy and for detecting said characteristic physical behavior of said marking,
(c) said mobile communication device and/or said authentication device comprising hardware and/or software for connecting said mobile communication device to a remote server containing authenticating software and/or authentication reference data,
(d) optionally hardware and/or software to encrypt the data transfer between said communication device and said remote server.

Accordingly the invention comprises a system for authenticating items, in particular a security document, having at least one marking, said marking exhibiting a characteristic physical behavior in response to activating energy, preferably electromagnetic radiation and/or electric or magnetic fields, said system comprising:

(a) a mobile communication device having data processing and storage capabilities, data transfer capabilities, user-interface capabilities, and machine-interface capabilities,
(b) an authenticating device, coupled to said mobile communication device, said authenticating device comprising a device for producing said activating energy and for detecting said characteristic physical behavior of said marking,
(c) a remote server comprising hardware and/or software to communicate to said mobile communication device, an authenticating software, and/or authentication reference data,
(d) optionally, means to encrypt the data transfer between said remote server and said communication device.

The invention will in the following be explained in more detail with the help of the accompanying drawings.

BRIEF DESCRIPTION OF THE DRAWINGS

FIG. 3 shows a schematic view of an authenticating device and an item 2 to be authenticated.

DETAILED DESCRIPTION OF THE INVENTION

Figure 1:
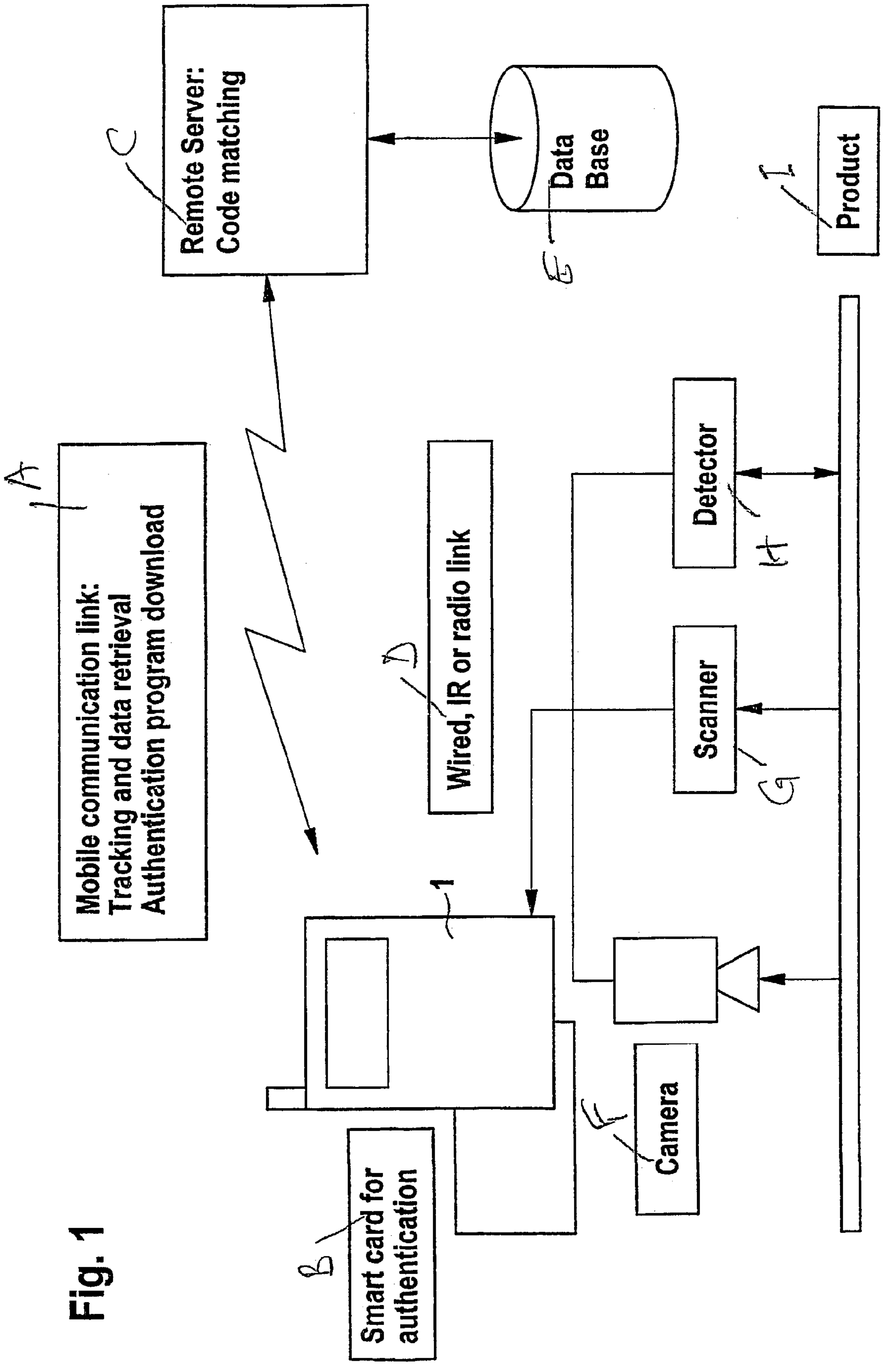
FIG. 1 shows a schematic view of invention, which concerns an authentication system for items, in particular branded goods and security documents ("Product"): An authenticity data captor, such as a camera, a scanner or an electromagnetic radiation detector, is connected or linked to a mobile communication device 1, capable of performing local data processing (smart card), and capable of communicating with a remote server (data base).
Figure 2:
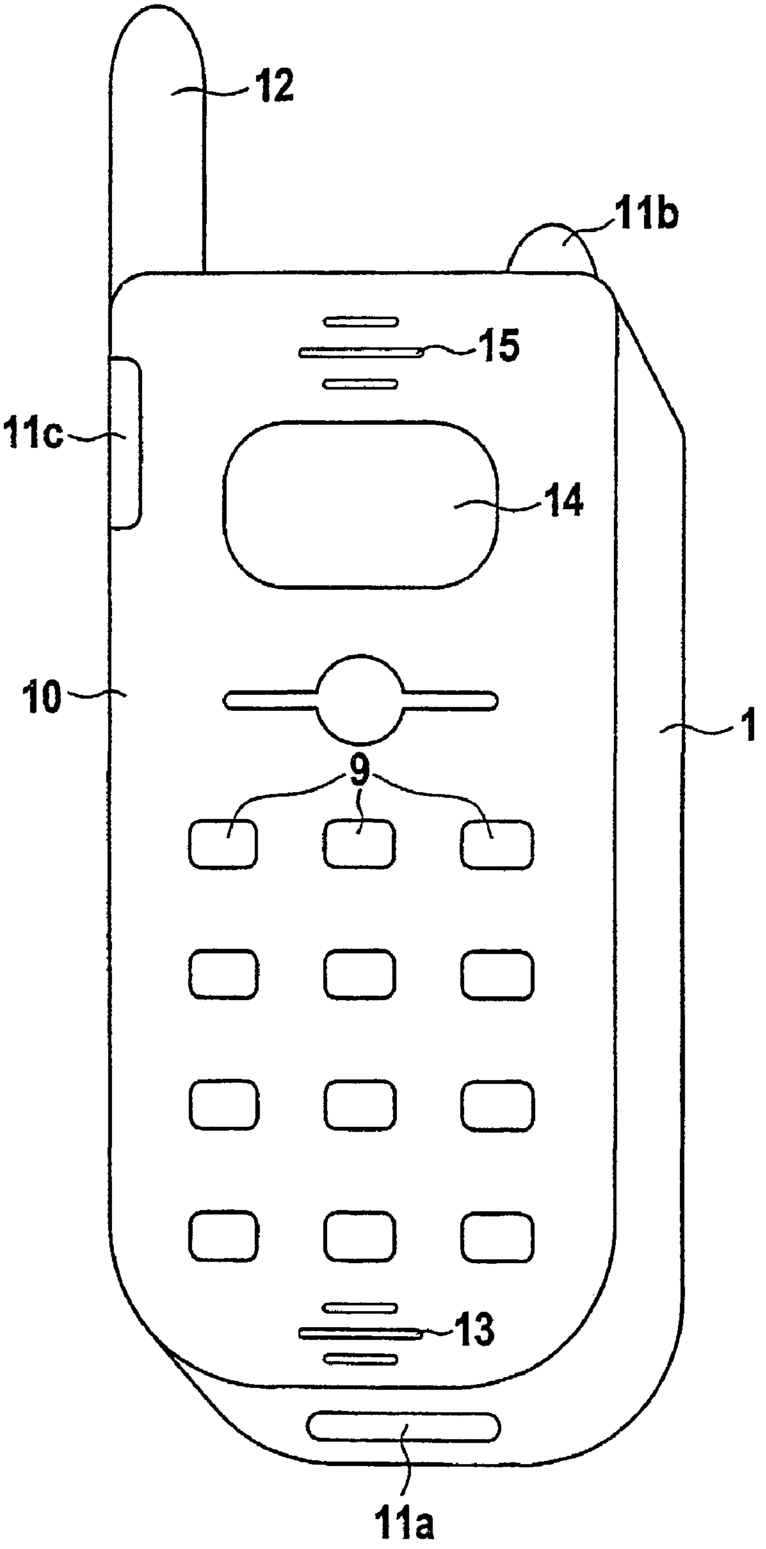
FIG. 2 shows a schematic view of an example embodiment of a communication device 1 for the authentication of items, such as can be used in the present invention.

According to FIG. 1 the mobile communication device 1 used for the authentication of an item may be a mobile phone, a handheld computer, an electronic organizer, an electronic terminal or a camera, provided with access to a mobile wide area telephone network (WAN). Said communication equipment 1 (FIG. 2) may comprise a housing 10, a wire-terminal connector 11*a*, an IR communication port 11*b* and/or a RF transmitter/receiver 11*c*. Particular use can hereby be made of already existing functional components of the communication device, such as a microphone 13, keyboard buttons 9, a display panel 14 and a speaker 15, for performing the authenticating function, managing the interaction with the user and, optionally, to display data contents. All these components are known to the skilled in the art and need not to be further described here. Said communication device may furthermore be operated mobile respectively stationary. A use of a combination of said functional components of communication equipment is, of course, possible as well.

The authenticating device or authenticity data captor, destined to primarily interact with said item or document to be authenticated, is either comprised in the communication device, or locally linked to it by a wire-link, by an IR communication port or by an RF transmitter/receiver port.

Figure 3A:
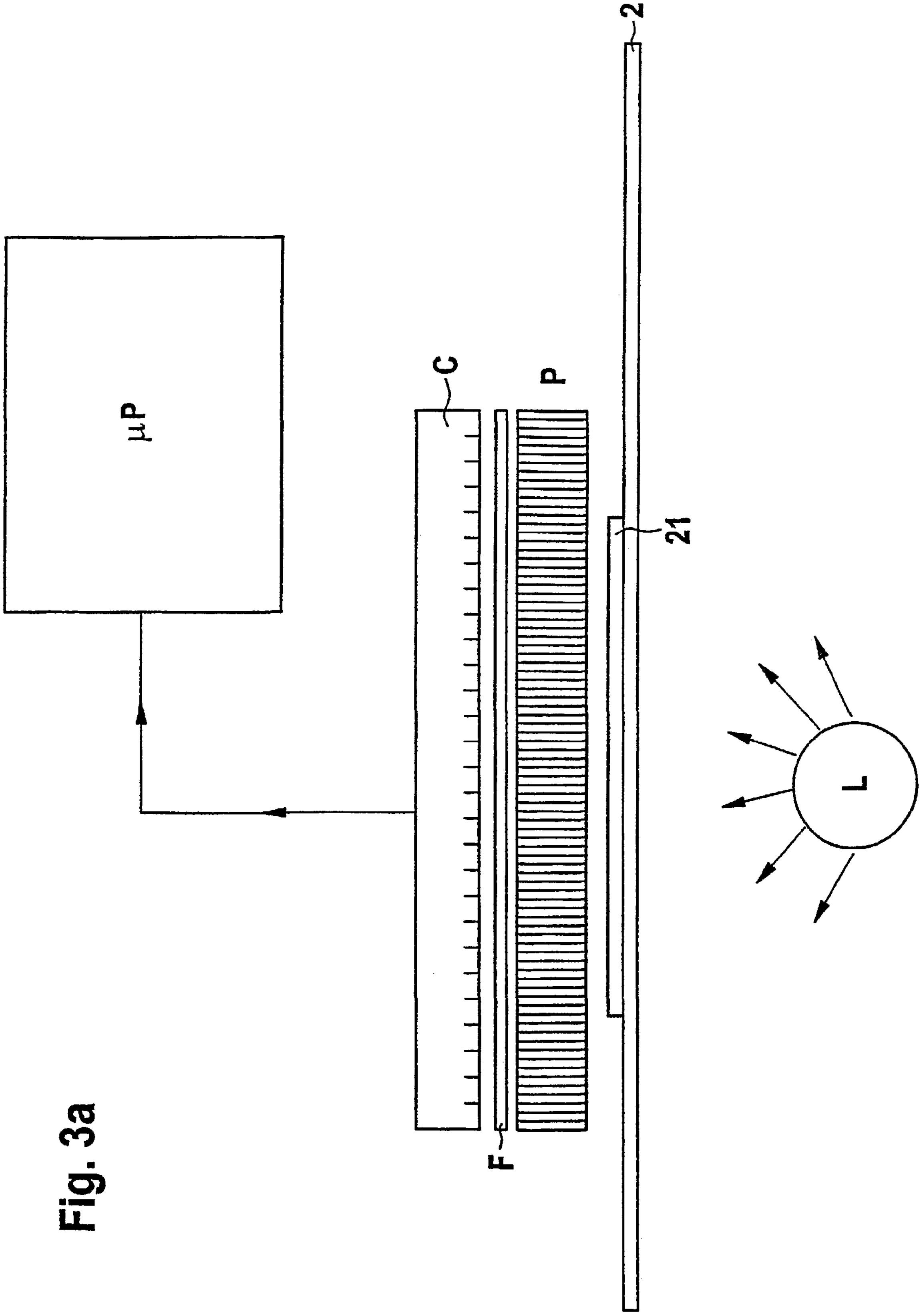
FIG. 3*a* shows a first embodiment of the device, using a CMOS micro-chip camera C in contact-copy mode with backside illumination L.
Figure 3B:
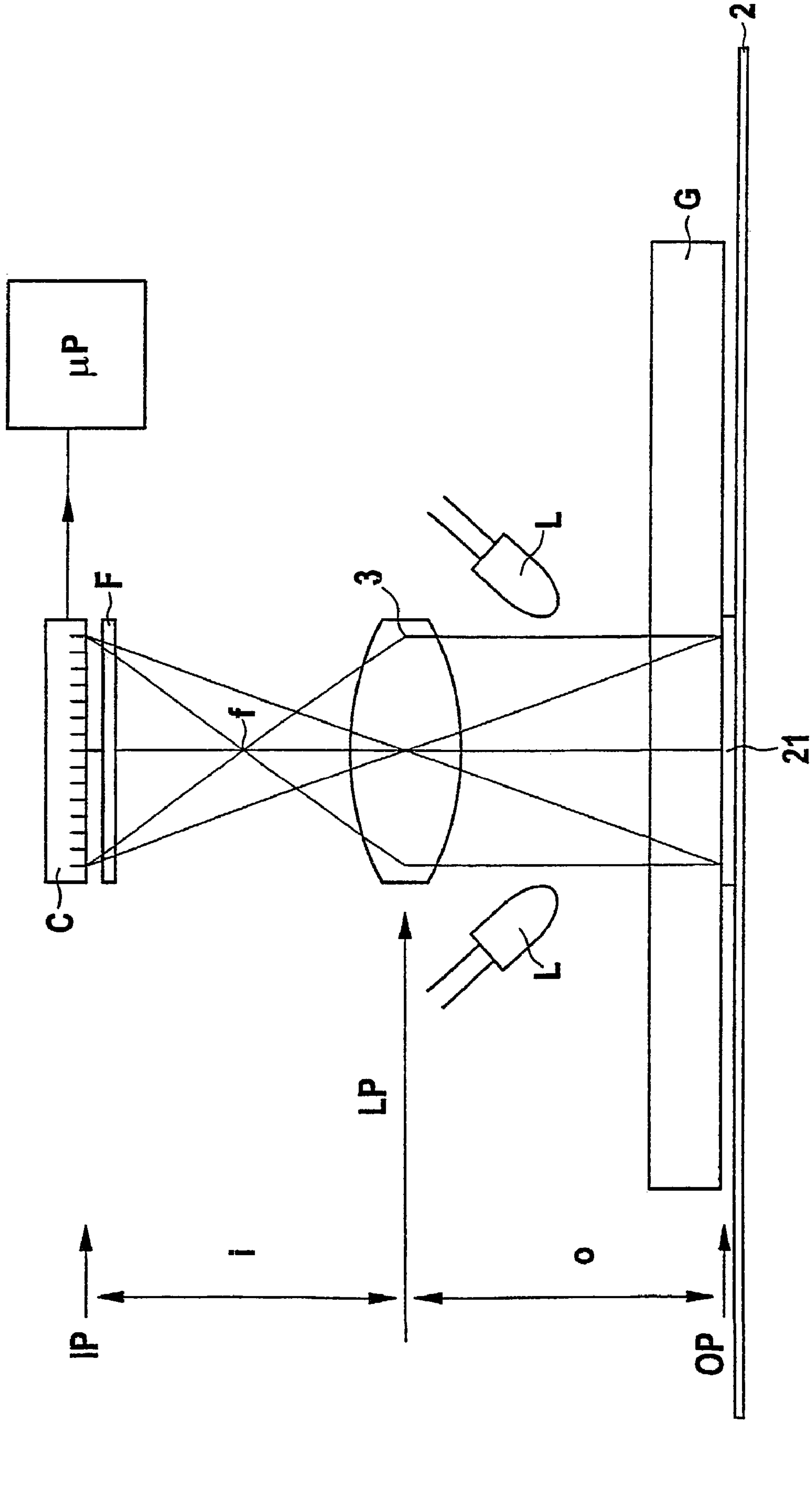
FIG. 3*b* shows a second embodiment of the device, using a CMOS micro-chip camera C in imaging mode with front side illumination L.
Figure 3C:
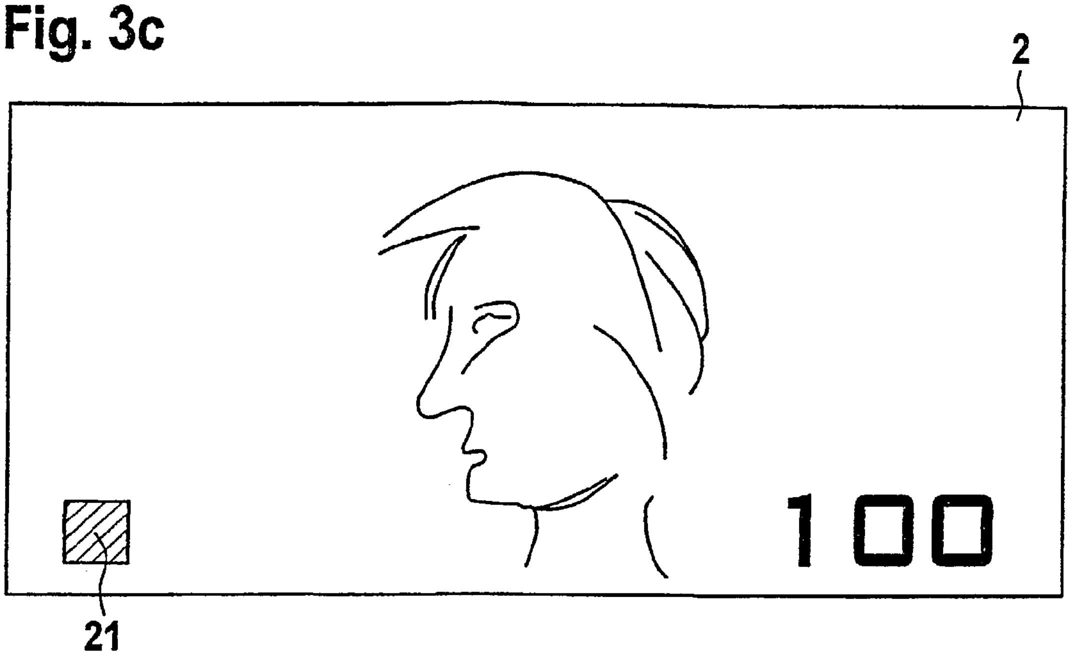
FIG. 3*c* shows a schematic view of a document to be authenticated using the devices of FIG. 3*a* or FIG. 3*b*, carrying a mark 21.

FIG. 3 shows an example of an authenticating device or captor. The item 2 to be authenticated may be an article or a document, in particular a security document. The item 2 may be flat with two surfaces, and carries at least one marking 21. Said marking is preferably a printed ink, having the property of specifically absorbing and transforming energy provided by said authenticating device. Said energy may be electromagnetic radiation and/or electric or magnetic field energy, which is transformed by at least one component of said ink into a characteristic response, which in turn can be captured by said authenticating device. Optionally, said authenticating device is also capable to read overt or covert localized or non-localized information carried by means of said ink on said item or document.

In a first-type embodiment of the invention, as shown in FIG. 3*a*, the authenticating device is a CMOS micro-camera chip C, integrated into a mobile phone 1. Said camera chip is equipped with a fiber-optic interface plate P, for taking an image of a part of the surface of said document 2 in translucency, using back-light illumination L and a 1:1 contact-copy imaging mode. The CMOS camera chip C is a single-chip digital micro-camera, comprising an array of 256×256 active-pixel sensors, together with the necessary camera readout circuitry, integrated on a 4.8×6.4 mm area. This corresponds to an individual pixel size of 18 μm. The active-pixel sensors support a certain amount of on-pixel signal processing, such as e.g. automatic sensitivity regulation, or a time-control of the pixel sensitivity (so-called lock-in pixels). Both, the light source L and the camera chip C are connected to a processor μP of the mobile phone. The fiber-optic plate P is a very short image-conduct, disposed on top of the camera chip in order to prevent the chip from being scratched by the contact with the document 2 or the environment. An optical filter F may optionally be present in the beam path, in order to select/delimit the camera's sensitivity wavelength range.

Alternatively, a 2-dimensional plastic lenslet array can be used in place of the fiber-optic plate P. Devices such as active-pixel-sensor CMOS camera chips, fiber-optic plates, and lenslet arrays are known to the skilled in the art and need not to be further explained here.

In an alternative embodiment, depicted in FIG. 3*b*, a lens 3 of short focal length f is used in place of the "contact-copy" assembly using a fiber-optic plate. In this case, the image on the document can be enlarged or reduced by correspondingly choosing the object plane OP and the image plane IP. The camera chip C is hereby located in the image plane IP of the lens 3, and a glass plate G is used to define the object plane OP. The respective locations o and i (distances from the center of the lens LP) of object plane OP and image plane IP are related to the focal length f of the lens by the lens formula:

$$f^{-1}=o^{-1}+i^{-1}$$

Choosing o=i=2f results in a 1:1 image of the object (marking 21) on the camera chip C. Optionally, an optical filter F may be disposed before the camera chip, in order to select the sensitivity wavelength range. Optionally, using this embodiment, the document can be illuminated from the front side by an illuminator L located behind the glass plate G defining the object plane OP.

According to the invention, the device is used to acquire an image of printed micro-indicia on a 5×5 mm area present in a corner of said document 2. Said micro-indicia are printed with an ink comprising a luminescent pigment. Said pigment is excitable by the light source L and has delayed luminescence emission with a characteristic intensity rise and decay behavior as a function of time. In particular, said light source L can be chosen to be a square 5×5 mm array of four flat, UV-light emitting diode chips (emitting at 370 nm wavelength), covered by a protecting glass plate, and said luminescent pigment in said ink can be chosen to be an europium-doped oxysulfide phosphor of the formula $Y_2O_2S$:Eu.

To authenticate the document 2, the code area 21 is inserted into the authenticating device and tightly hold between the glass plate of the light source L and the fiber-optic plate P, or pressed against the object-plane defining glass plate G, respectively, of the authenticating device. The authenticating process is governed by a processor μP of the mobile phone, according to a particular program stored in the processor's memory, or contained in, e.g. a Java card. The authentication comprises the steps of i) switching on the light source L during a short time interval (e.g. 1 ms), ii) by correspondingly controlling the active pixels of the CMOS camera chip, measuring the delayed luminescence intensity at least at a first time after switching off the light source, iii) optionally repeating step i) and measuring the delayed luminescence at one or more further times after switching off the light source, iv) retaining only those pixels which exhibit specific intensity characteristics at the times of measurement, v) authenticating the image formed by the pixels retained in step iv).

The measuring process, according to the invention, is controlled by the mobile phone's internal processor and memory, in so far that the variables of the measuring process are not implemented in a fixed way in the authenticating device, but rather supplied by the mobile phone, by means of e.g. a downloaded or otherwise supplied measurement protocol and reference data, which may be contained in a Java card or the like. In the present embodiment, the selection of the correct luminescence decay characteristics for the luminescent pigment to be detected constitutes a first set of such variables of the measuring process.

The data read out of the CMOS camera are subsequently transferred to the mobile phone's processing and storage means, where they are either authenticated locally, by said downloaded or otherwise supplied measurement protocol and reference data. Said authentication may take the form of a statistical correlation. If S is the measured signal image, represented by a vector of 256×256 (i.e. 65'536) intensity values corresponding to the camera's resolution, and R is a corresponding reference image, represented by a similar vector, the normalized inner (scalar) product of both vectors $(\langle S|S\rangle * \langle R|R\rangle)^{-1/2} * \langle S|R\rangle$ represents a measure of similarity; in fact, for S=R this product is 1. Appropriate pretreatment and weighting schemes may be applied to S and R prior to correlation. Other forms of comparison and other algorithms may, of course, be used for the data evaluation, whereby a particular interest is devoted to data compression and transform algorithms, as well as to rapid decoding/comparison algorithms, which avoid excessive calculation times.

In an alternative embodiment, said data are transmitted to a remote server for authentication, using the mobile phone's communication capability, and said remote server transmits back to the mobile phone the result of the authentication operation. The authentication result is in both cases displayed using the mobile phone's data display capability. The mobile phone's data processing capability is used herein to compress and encrypt the data for a rapid and secure transmission, and to decrypt the received result.

The off-line (local) authentication in connection with a mobile phone or similar mobile communication equipment has noteworthy the advantage of saving on connection time (the mobile phone must not be connected while performing the authenticity checking), while retaining the benefit of downloaded operation protocol and reference data. Thus, neither the mobile phone nor the authenticating device do contain sensitive data when they are out of use. The authenticating system is furthermore extremely flexible as to a change of authentication algorithms or reference data; a single connection to its remote master-server is sufficient to reprogram it for a different application. The same hardware may thus serve a huge number of different application targets, which is a decisive advantage particularly for custom-office applications, where a large number of different goods must be checked.

Figure 4:
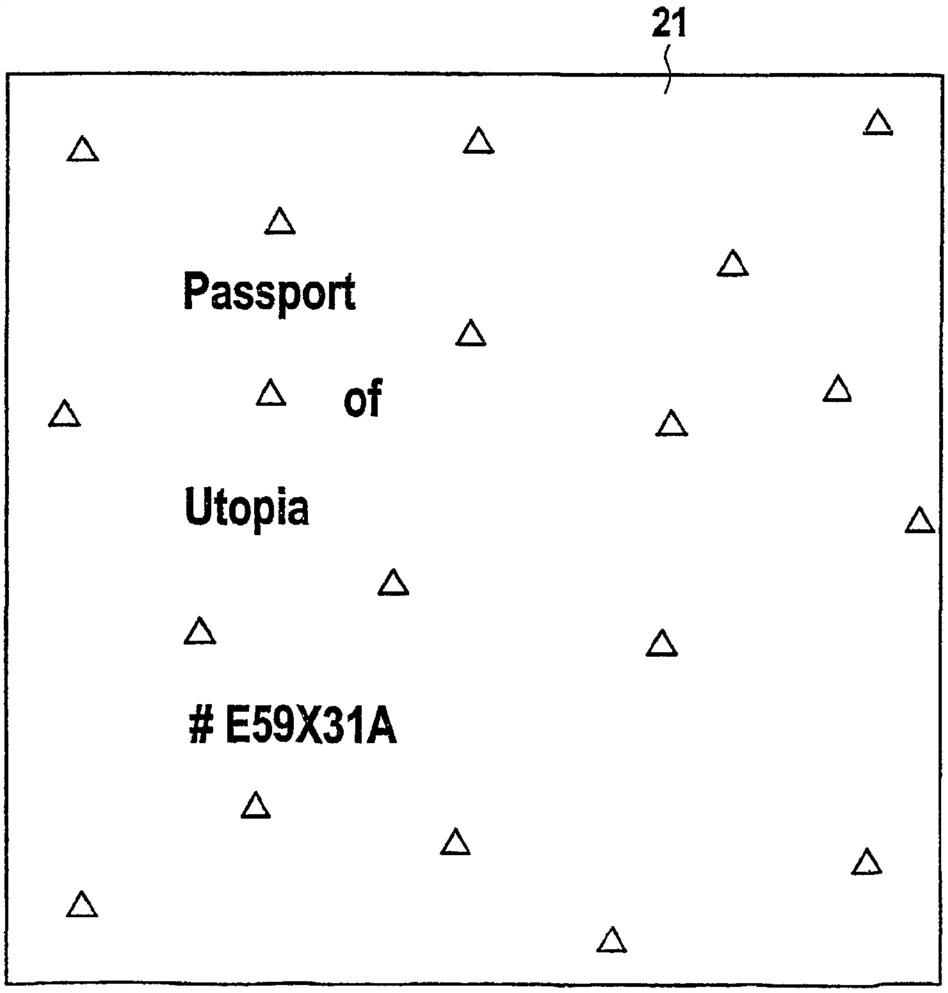
FIG. 4 shows a particularly useful embodiment of the security marking 21, relying on an identity-conferring pattern of particles or flakes having particular physical properties, combined with a micro-text numbering.

In yet another embodiment of the first type, particularly useful for identity documents, the security marking is a random-pattern of optically authenticate-able flakes or particles, applied over a printed micro-text, as shown in FIG. 4. Said random-pattern of particles is produced by over-coating said printed document, at least in part, with a clear varnish containing said optically authenticate-able particles in an appropriate concentration. Said over-coating varnish may have additionally a protecting function, and said optically authenticate-able particles may have particular optical characteristics, such as spectrally selective reflectivity, angle-dependent color appearance, luminescence, polarization, etc. Said over-coated micro-text is preferably a micro-numbering, having a letter-size of less than 1 mm, preferably less than 0.5 mm.

Said micro-numbering individualizes the document, but is for itself not sufficient to confer it an identity (the numbers alone might noteworthy be copied to a counterfeit document). By the means of the randomly distributed and physically identifiable (authenticate-able) particles comprised in the over-coating, the numbered document is individualized.

The corresponding authentication process relies on a combined recording, by the camera chip, of the micro-number of the document, surrounded by its unique particle pattern, whereby the optical characteristics of said particles may additionally be checked for authentic physical properties. A reference image of the authentic document's "micro-number cum pattern" is stored in a remote server, to which the authentication request is transmitted, together with the recorded image data of the document in question. Only image pixels of the pattern having correct, expected physical properties are hereby transmitted.

In a second-type embodiment of the invention, the authenticating device is a micro-spectrometer for performing spectral analysis in the near-infrared (NIR, 700 nm to 1100 nm) wavelength range, contained in an accessory to the mobile phone, which is wire-linked to it via the phone's hardware multi-pin connector.

Said micro-spectrometer consists of an incandescent light source, illuminating a particular point on the sample, and a planar-waveguide/focussing-grating device as described in DE 100,10,514 A1, mounted on a photodetector array having 256 linearly arranged light-sensitive pixels. In alternative embodiments, photodetector arrays having more or less pixels can be used, too, resulting in a different spectral resolution. Such micro-spectrometer assemblies, as well as their mode of operation, are known to the skilled in the art.

Said photodetector array is read-out by on-board electronic circuitry, and the resulting spectral information, i.e. the intensity of the sample's diffuse reflection as a function of the light wavelength, is transmitted via the wire-link to the mobile phone's processor, which either performs the authentication locally, or transmits the data to a remote server, as outlined above.

The spectral feature to be detected may be a printed ink containing a naphthalocyanin pigment, such as copper-octabutoxynaphthalocyanin described in DE 43 18 983 A1. This pigment has a characteristic absorption peak in the infrared, at 880 nm wavelength, while being substantially colorless in the visible range of the spectrum. The micro-spectrometer can be used to detect inks containing 2-5% of this pigment, added as a security element to "ordinary colors"; the complete spectral information obtained indicates not only the presence of just an infrared absorber, but also the correct chemical nature of this absorber, as inferred from the location and the form of the absorption peak.

In an alternative embodiment, the spectrometer is used for detecting luminescent emission from printed inks. E.g. an ink containing 5% of a neodymium-doped yttrium vanadate pigment ($YVO_4$:Nd) is excited using a yellow-emitting LED (at 600 nm wavelength). The $Nd^{3+}$ emission multiplet at 879 nm, 888 nm, and 914 nm, with its characteristic intensity ratios, is measured with the micro-spectrometer and interpreted in terms of an authenticity feature. Other neodymium-containing luminescent pigments, such as e.g. $Y_2O_2S$:Nd, show a different curve form of the emission around 900 nm, and can thus be used to represent different authenticity features. Mixtures of neodymium-containing luminescent pigments can be employed as well, to produce an even higher number of possible spectral varieties, which can be distinguished at the curve form of their emission spectrum.

In still an alternative embodiment, the spectrometer is laid out for operation in the farther part of the NIR wavelength range (900 nm to 1750 nm), using an InGaAs linear photodetector array and a corresponding spectrometer grating. In this spectral range, certain rare-earth containing materials, as well as certain radical-containing vat dyes (e.g. those described by J. Kelemen in Chimia 45 (1991), p. 15-17), can be used as an infrared absorbing component of an ink. It is easy for the skilled in the art to conceive analogous applications outside the mentioned wavelength domains, such as e.g. in the ultra-violet or in the visible domain of the electromagnetic spectrum, as well as in the mid-infrared (2.5 μm to 25 μm) domain, which corresponds to the frequencies of the molecular vibrations.

The spectral data can be correlated with reference data by forming a normalized inner product $(\langle S|S\rangle * \langle R|R\rangle)^{-1/2} * \langle S|R\rangle$ of the signal (S) and the reference (R) vectors, using pretreatment and weighting if appropriate, as outlined above. The spectral data can noteworthy be analyzed by applying to it the mathematical tools of Principal Component or Factor Analysis, which allow to trace back the observed spectral variations to the individual concentrations of the dyes or pigments constituting the absorbing part of the ink.

In a third-type embodiment of the invention, the authenticating device is a hand-held optical image scanner, linked to the mobile phone via a radio-frequency (microwave) link of the "Bluetooth" type. "Bluetooth" is a standardized radio-frequency (RF) data transfer system for local area networks (LANs), operating in the free 2.4 GHz ISM (Industrial Scientific Medecine) band (2.400-2.4835 GHz), comprising 78 frequency-keyed RF channels, which are exploited in spread-spectrum frequency-hopping mode. The RF output power may range from 1 mW up to 100 mW, depending on the transmission range to be achieved. An output power of 1 mW allows to establish a sure RF communication over several tens of meters even within a building; the RF penetrates quite well through non-metallic objects and walls. In the case of a "Bluetooth" or similar RF link, the mobile communication device may therefore be kept moderately remote from the authenticating device.

The hand-held image scanner is a pen-type device as known in the art for the hand-scanning and translation of words or text lines, e.g. the "Pocket Reader" from Siemens AG. The device used contains a rolling wheel for sensing the scanning speed, an infrared LED light source emitting at 950 nm wavelength as an illuminator, a linear photodetecting array with imaging optics, preceded by a bandpass filter having a transmission window 950 nm-1000 nm, and a processor chip with memory for analyzing the scanned data. It furthermore has a display line and touch-buttons for operator input. The scanner contains a Bluetooth communication module, for hooking up with a similar module contained in the mobile phone. The scanned data are transmitted via this link to the mobile phone, where they are either processed or further transmitted as indicated above.

The security marking in this example is an invisible, IR-absorbing pattern, printed with an ink containing 10% of $YbVO_4$ as the IR-absorbing pigment.

In a fourth-type embodiment of the invention, the authenticating device is a hand-held magnetic image scanner, linked to the mobile phone via an infrared connection link of the IrDA-type. IrDA is an optical data transfer protocol for local area networks (LANs), defined by the Infrared Data Association. It uses an infrared transmission link in the wavelength range 850 nm-900 nm, based on IR-LEDs or laser diodes as the emitters and photodiodes as the receivers. The normal data transfer rate for a serial link is specified as being 9.4 kb/second, but transfer rates of 2.4 kb/s, 19.2 kb/s, 38.4 kb/s, 57.6 kb/s, 115.2 kb/s, 0.576 Mb/s, 1.152 Mb/s, and 4.0 Mb/s are also supported by the optical link. Light emission intensity is in the range of a few milliwatts to a few tens of milliwatts, enabling optical communication over a range of a few decimeters up to a few meters. The authenticating device must thus be kept in optical contact with the mobile phone during operation.

The magnetic image scanner is based on a linear array of integrated magnetic field sensors, which may either be of the magneto-resistive (GMR) or of the Hall-effect type. Such elements, which are known to the skilled in the art, e. g. from U.S. Pat. No. 5,543,988, sense the presence of local magnetic fields, such as those resulting from a permanently magnetized printed material, and deliver corresponding electric output signals. They can be used to map magnetic field distributions along a line or over a surface area.

In this embodiment, an ink containing a "hard" (permanent) magnetic material, such as strontium hexaferrite ($SrFe_{12}O_{19}$), is used to print the marking. Such materials are available from Magnox, Pulaski Va., under the name of "Mag-Guard", and have coercivity values of 3'000 Oersted or more. The pigment is permanently magnetized after printing, by applying a correspondingly strong magnetic field in determined regions of the document. The so stored magnetic image is not erased under normal use conditions, and can thus serve as a permanent security feature. For reading the image, the magnetic scanner is moved over the corresponding site on the document, and the scanned data are transmitted via the IR-link to the mobile phone, where they are either processed or further transmitted as indicated above.

In still a further alternative embodiment, a soluble silicon-naphthalocyanine derivative, absorbing in the 850-900 nm wavelength range and re-emitting at 920 nm was dissolved in a liquid ink and applied by flexographic printing onto a blister-package foil in the form of a product barcode. This product barcode was read with the help of a especially designed pen-shaped barcode reader, connected to an electronic organizer of the NOKIA "Communicator" type. The barcode reader comprised a 880 nm LED as the excitation source. The excitation light was delimited by a bandpass filter to 880±10 nm. The luminescent emission from the barcode was detected by a silicon photodiode, whose spectral sensitivity range was delimited by a bandpass filter to 920±10 nm. Said silicon photodiode is part of a photo-IC of the type S4282-11 from Hamamatsu. Said photo-IC enables noteworthy optical synchronous detection under background light; it generates a 10 kHz pilot signal to drive the excitation LED, and is sensitive exclusively to response signals which correspond to the pilot signal in frequency and phase. Said photo-IC, excitation LED, and optical filters are all arranged within the pen-shaped housing of the barcode reader, together with plastic light guides for guiding the light from the LED to the pen's tip, and the emission from the document back to the photo-IC. The photo-IC in this barcode reader delivers a digital output signal, which is representative of the presence or absence of luminescence at the pen tip.

In yet another embodiment, the mobile communication equipment contains components to perform a simple physical authenticity checking on a security document. In this example, an UV light source (e.g. an UV-LED emitting at 370 nm with 1 mW optical output power) irradiates a determined location containing a security feature on said document. Said security feature is printed with an ink containing the narrow-line luminescent compound $Y_2O_2S$:Eu, which has a visible emission in the red, at 625 nm. The luminescent response at 625 nm is recorded by a silicon photodetector, through a narrow-line optical bandpass filter 625±1 nm. To discriminate the luminescent's response from ambient background light, the excitation source is switched on and off in short intervals, and the photodetector is made sensitive only to the difference between the "excitation-on" and the "excitation-off" states. A "authentic"/"counterfeit" signal is issued as the result of the testing. The resulting signal can be displayed as a visual and/or audible signal; the latter, i.e. the use of the mobile communication equipment's speaker for announcing the test result, is a particularly useful option for the blind people. It will be understood that other luminescent materials, emitting at other wavelengths in the UV, visible or infrared part of the spectrum, in combination with other detector set-ups and filters for observing the luminescent emission, can be used in the context of the invention.

In a variant of the previous embodiment, a luminescent ink having a characteristic luminescence decay time is used to print the security feature, and the luminescence decay time is assessed via a determination of the modulation-transfer function of the luminescent emission, using a pulsed excitation sequence at various pulse repetition frequencies: E.g. the ink contains the luminescent compound $Y_2O_2S$:Nd, which emits at 900 nm wavelength having a luminescence decay time of the order of 70 μs. The luminescence is excited by a 370 nm LED, which is modulated by a low-frequency signal of frequency f. The luminescence response is detected in-phase to the modulation frequency f, such that background light contributions are effectively suppressed. When the modulation frequency f is scanned from 1 kHz to 20 kHz, a drop of the detected signal is observed at 14 kHz; above this frequency, the luminescent is no longer able to transfer the modulation of the excitation source. This drop in the modulation-transfer function is a measure of the luminescence decay time. An "authentic" signal is thus issued only if the correct luminescence decay time has been detected at the response wavelength. It will be understood that other luminescent materials and other set-ups for determining the luminescence decay time can be used in the context of the invention.

Another embodiment provides for the authentication of optically variable inks or devices via the recognition of the characteristic angle-dependent spectral reflection features of these items. Angle-dependent reflection characteristics are strongly tied to particular materials and to the corresponding, often expensive, manufacturing processes, and therefore hard to counterfeit. The embodiment for the authentication of optically variable inks is a variant of the micro-spectrometer-based embodiment disclosed above. Two micro-spectrometers, or, preferably, a double-spectrometer are used for collecting substantially parallel light from the item or document at two predefined viewing angles, one corresponding to near-orthogonal and the other to near-grazing view. In the embodiment, these observation angles were chosen at 22.5° and at 67.5° with respect to the normal to the printed sample surface, and the beam divergence of the collected light was kept within ±10°. The sample is preferably illuminated with diffuse incandescent light incident from the opposite site.

In a further embodiment, the communication equipment is laid out for detecting a characteristic radio frequency or microwave resonance on said item. Said resonance can be a natural resonance of a material, e.g. the internal nuclear magnetic resonance line of cobalt metal in its own magnetic field (ferromagnetic nuclear resonance, located at about 214 MHz) can be exploited. The security document is marked with an ink patch containing metallic cobalt powder. The detecting unit comprises a frequency generator at 214 MHz, an excitation/sensing coil, a receiver at 214 MHz, and a rapid switching unit. The coil is brought in proximity of the sample (ink patch) under test, and its terminals are rapidly switched forth and back between the frequency generator and the receiver at 214 MHz. The ferromagnetic resonance material gets excited during the frequency generator phase of the coil, and radiates RF-energy (free-induction-decay) during the receiver phase of the coil. The presence of 214 MHz-responsive ferromagnetic resonance material turns thus up as a signal at the RF receiver, from which an authentication result can be derived. It will be understood that other natural RF- or microwave-resonant materials, as well as other detector set-ups can be used in the context of the invention.

Alternatively, an artificially produced resonance, due to an electric LC-circuit, a metallic dipole, a piezoelectric element (quartz crystal, surface-acoustic-wave (SAW) device, etc.), or a magnetostrictive element can be exploited. The detector set-up is analogous to that for detecting natural radio frequency or microwave resonance. All these technologies are known to the skilled in the art and need not to be further described here. The communication equipment is hereby either specifically equipped with the necessary components including the detecting units.

Still a further embodiment relies on amorphous magnetic materials as the marker, such as $Co_{25}Fe_{50}Si_{15}$ or the like, which show easy magnetization with low coercivity (<5 Oe), high squareness of the hysteresis curve, and a correspondingly high Barkhausen effect. These materials and the corresponding reading equipment are known to the skilled in the art of Electronic Article Surveillance (EAS) applications.

In the following, an example of an authenticating cycle, using a micro-spectrometer authenticating device according to the second-type embodiment, is given. The item to be authenticated is a tax banderole, such as is issued for the perception of taxes on alcoholic beverages by state agencies. The tax banderole carries a printed ink patch, showing a particular spectral feature in the infrared diffuse reflectance spectrum in the 700 nm to 1000 nm range. Said particular spectral feature is produced by the admixture to the ink of an infrared absorber pigment, which may be of the types mentioned above.

The authenticating equipment comprises an authenticating device, which is wire-linked to a mobile phone via the phone's serial connector. The mobile phone comprises a chip card with processor and memory, able to interact with the authenticating device. The authenticating device comprises a micro-spectrometer with collection optics, mounted on a 256-pixel linear photodetector array, a small incandescent light source, as well as read-out and digitalization electronics for the photodetector array and an interface for data transfer from and to the mobile phone's serial port. The authenticator device is powered by the mobile phone's battery.

To authenticate the tax banderole in question, the corresponding authenticating algorithm (program), as well as the reference infrared absorption spectrum, are first downloaded into the phone by a call to a password-protected remote server. The program and reference data are installed in the phone's chip card and the program is launched via a corresponding keyboard input at the phone. The authenticating device is positioned on the tax banderole, on top of the ink patch to be authenticated, and the measurement is launched by pressing a key on the mobile phone. The incandescent lamp and the micro-spectrometer are powered up, and a diffuse reflectance spectrum is acquired and stored in the mobile phone's chip card. Then the authenticating device is immediately powered down again, to save battery. The whole measurement cycle takes less than a second.

The measured data (S), stored as a vector of 256 spectral intensity data points ($s_i$) representing the wavelength range from 700 nm to 1000 nm, is appropriately pretreated, e.g. by subtracting the measured mean ($s_{mean}$) intensity value from each of the spectral points ($s_i := s_i - s_{mean}$). The downloaded reference data (R) is equally stored as a vector of 256 spectral points ($r_i$) corresponding to the same wavelength range. Preferably, the reference data is normalized, i.e. $\Sigma r_i^2 = 1$.

The similarity of measured data (S) and reference data (R) is checked via the correlation coefficient $c = \Sigma r_i s_i / (\Sigma s_i^2)^{1/2}$, R is assumed being normalized. If the correlation coefficient c equals 1, the waveforms (reflectance spectra) of measured data and reference data are equal. In general, c can take any value between −1 and +1. The measured sample is declared to be authentic if c is above a correspondingly defined and previously downloaded limiting criterion $c_{lim}$.

The processor in the mobile phone performs these operations, and displays an "authentic" or "counterfeit" message on the mobile phone's display unit. An audible signal may be displayed as well through the mobile phone's speaker.

Alternatively, the deviations of the normalized measured data and the reference data can be used as a decision criterion. To this aim, the measured data (S) are first normalized, such that $\Sigma s_i^2 = 1$. The reference data (R) is assumed being normalized, too. The mean deviation $d = (\Sigma (s_i - r_i)^2 / N)^{1/2}$, with N=number of sampling points (256 in our case), is a measure of divergence between measured (S) and reference (R) data, which can be checked against said decision criterion. If d exceeds a correspondingly defined criterion $d_{lim}$, the measured sample is declared to be counterfeit.

Said authenticating of samples can occur off-line once the authenticating algorithm and reference data have been downloaded, using the simple authenticating device connected to the mobile phone. The authentication result is displayed off-line. It can optionally be retained in the phone's memory, together with user-input or scanned item identifiers and the like, for a later uploading to the remote server.

Alternatively, said algorithm can also be carried out on the remote server; in which case the mobile phone simply uploads the measured data (S), in its case together with user-input or scanned item identifiers and the like, to the remote server, and receives back the result of the authentication operation. In this case, the remote server can directly protocol the authentication operation.

The authentication software is preferably distributed only to a limited number of authorized users, which have given access to it via corresponding passwords and encryption keys. Preferably, the data transfer between the communication device and the remote server is secure, i.e. protected by corresponding encryption/decryption keys.

So far, only the authentication of physical features has been considered. In a more advanced embodiment, the checking comprises as well the reading of logical information on said item. In an example, a 1-D or 2-D barcode, printed on the item with magnetic ink, is read with the help of a one- or two-dimensional magnetic sensor array (e.g. of the magneto-resistive type, or of the Hall-effect type) and evaluated in terms of authenticity of the item in question. Magnetic sensor elements of the magnetoresistive type commercially available, e.g. the KMZ-51 from Philips. They can be arranged in arrays and have sufficient sensitivity to measure weak magnetic fields, such as the field of the earth. A Hall-effect sensor array has been described in U.S. Pat. No. 5,543,988. The realization of a magnetic ink detector for documents is described in U.S. Pat. No. 5,552,589. It shall be understood that said barcode and the corresponding detector unit can also be realized with other than magnetic technology: e.g. UV-absorption, IR-absorption, narrow-line visible absorption, UV-visible-IR range luminescence, dielectric or metallic printing, etc.

In a simpler version, the reading of information relies on a single-channel detector, combined with a manual scanning of the sensitive area of the item to be authenticated. The simple luminescence, metallic and magnetic sensor units described herein before can advantageously be used for this purpose. It shall be understood that the single-channel detecting unit can again be realized in any technology which lends itself to a reading of information from a support.

The reading of item information can be combined with a visual or audible reproduction of certain information contents. In particular, using the audible display, a currency detector/authenticator for the blind people can be realized, which, after authenticating the currency, audibly announces the respective currency unit and denomination.

A particular embodiment relies on information stored within a microchip transponder, contained in or on said item. Microchips bonded onto the security thread of a banknote, using the metallised parts of it as their antenna, are feasible and have been presented to the security community. In this embodiment, a spread-spectrum transmitter contained in the communication equipment, or in an accessory to it, is used to interrogate the microchip transponder and to read the stored information for checking purposes. Transponder chips operating in spread-spectrum technology in the required frequency bands (e.g. the 2.4 GHz ISM band) are known to the skilled in the art. It shall again be understood that, in the context of the invention, the communication with the microchip transponder can rely on any feasible technology and is not restricted to the mentioned spread-spectrum communication protocol.

In a particularly preferred embodiment, use is made of the communicating facility of communication equipment, to cross-check the authenticity information of said item, specifically of a document, in particular of a security document with the issuing authority's data on said item. Security documents (such as bank notes, credit cards, passports, identity cards, access cards, driving licenses, etc.) can noteworthy be marked to their physical identity by a number of ways: incorporation of random distributions of colored, luminescent, metallic, magnetic, or other particles or fibers into the paper or plastic substrate of the document; printing of ink patches containing random distributions of determined, detectable particles of said types; laser- or ink-jet marking of the security document with an appropriate random pattern; etc. . . .

This identity data, which is unique to the item concerned, can be tied by the issuing authority to the particular security document's serial number, and the resulting correlation data can be made available in a database for cross-checking purposes. The security document's identity conferring feature is sensed by an appropriate detector incorporated into the communication equipment, and the resulting identity data is mailed, together with the security document's printed serial number, to the issuing authority's database. A "yes" or "no" answer is then mailed back to the sender, to confirm or to infirm the physical authenticity of the security document in question.

In an example of this embodiment, an ink patch containing opaque, particles of 30-50 μm size is applied to the item by screen printing. The particles are preferably flat and can e.g. be chosen out of the groups of optically variable pigment flakes, aluminum flakes or opaque polymer flakes. The concentration of flakes in the ink is arranged such that the number of flakes per $cm^2$ is preferably chosen to be of the order of 10 to 100.

The flake pattern, which is characteristic for each individual item, is sensed within a well-defined area of the document in translucency by a two-dimensional CCD sensor element, applied in contact-copy mode onto the area concerned. The CCD sensor element has typical dimensions of 0.5 inch by 0.5 inch (i.e. 12×12 mm) with, depending on the pixel size, either 256×256, 512×512 or 1024×1024 active pixels. In the context of the present example, a 512×512 pixel sensor proved to be sufficient. Such elements and corresponding driver electronics are commercially available. According to the art, a fiber-optic plate is preferably inserted between the sensor surface and the print, in order to protect the sensor from dirt and mechanical damage, without degrading its optical resolution performance.

The first checking of the so marked item with the CCD-sensor is performed after printing, and the resulting picture of dark micro-spots is stored, together with the document's serial number, in the issuing authority's database. Upon authentication by a user, the document is applied onto a corresponding sensor element contained in communication equipment, and the resulting picture of dark micro-spots is mailed, together with the document's serial number, to the issuing authority's database, where the degree of correspondence with the originally stored data is determined by an algorithm, and the authentication result is mailed back as a "Yes" or "No" answer to the user.

Again, the detector for sensing the document's identity information can be of any technology which lends itself to the purpose: optical transmission-, luminescence-, magnetic-, dielectric-, radio-frequency- and other types of sensing are possible; the sensor can furthermore be of the single-channel- (hand-scanning-), of the linear array-, or of the two-dimensional-area-type; and the identity checking procedure can be performed with manual input of the security document's serial number, or in a fully automated fashion.

Accordingly, the invention preferably relies on a system for authenticating an item, in particular a security document, having at least one marking. Said system comprises a mobile wide-area network (WAN) communication device, connected or linked to an authenticating device. Said marking reflects or emits electromagnetic radiation and/or exhibits particular electric or magnetic characteristics in response to interrogation by said authenticating device. Said marking may further contain logical information, vectored through said radiation or characteristics, and said characteristic response and logical information are captured by said authenticating device. Said system comprises further a remote server, including hardware and software to establish a link to said mobile communication device via a wide area network and to exchange data with it, said data noteworthy comprising authenticating software and/or authentication data and/or reference data. Said remote server may also perform authenticating operations centrally. Optionally said system comprises means to encrypt/decrypt the data transfer between said remote server and said communication device.

The invention refers further to an item to be authenticated, wherein the marking of the item is interacting with the authenticating device of the communication equipment.

The invention refers in particular to an item, wherein a plurality of at least one type of optically authenticate-able flakes or particles are arranged within the marking, forming a characteristic, identity-conferring random-pattern.

The invention refers in particular to an item, wherein an invisible 1-dimensional or 2-dimensional barcode is arranged within the marking, carrying characteristic logical information about the item.

The invention refers in particular to an item, wherein a magnetic information carrier is arranged within the marking, carrying characteristic logical information about the item.

The invention refers in particular to an item carrying a laser security marking, comprising characteristic logical information about the item.

The invention refers in particular to an item carrying a radio frequency transponder, comprising characteristic logical information about the item.

It is easy for the skilled in the art to conceive other modifications according to which the invention can be embodied. These may noteworthy include the use of mobile communication equipment other than mobile phones, given that said equipment has data processing and storage, wireless communicating, and user- and machine-interface input-output capability. These embodiments do further include the use of other sensor accessories, such as pen-shaped barcode readers, laser scanners, or external imaging units. These variants do also include the exploitation of other physical effects than the mentioned ones as characteristic security-conferring features. Such effects may noteworthy include UV-absorption, magnetostriction, Barkhausen effect, RF or microwave resonance, dielectric properties, and the more.

The invention claimed is:

1. A method for authenticating a security document with the help of a mobile communication equipment selected from the group consisting of a mobile phone, a handheld computer, an electronic organizer, an electronic terminal, and a camera, which is provided with access to a mobile wide area telephone network; said mobile communication equipment having an authenticity data captor which is either integrated into the mobile communication equipment or connected to the mobile communication equipment by a link selected from the group consisting of a wire link, a short-range radio link, and a short-range infrared link, said document having at least one marking selected from the group consisting of printed features and coatings, wherein said marking comprises a characteristic particle or flake pattern or at least one material selected from the group consisting of a magnetic material, a luminescent material and an infrared-absorbing material, said method comprising the steps of detecting a response signal, which is emitted by the said marking in response to an applied energy, and which is a physical characteristic of the group of characteristics consisting of spectrally selective absorption of electromagnetic radiation, spectrally selective emission of electromagnetic radiation, and measurable electric or magnetic characteristics with the help of the said authenticity data captor;

comparing the detected response signal to reference data; and authenticating said detected response signal in the said mobile communication equipment, based on a result of the comparison between said detected response signal and said reference data;

wherein said method comprises preliminary steps of downloading a measuring and an authenticating algorithm from a remote server or a data base into the memory of said mobile communication equipment;

downloading said reference data from a remote server into the memory of said mobile communication equipment;

producing said response signal according to a measuring algorithm, using said authenticity captor;

authenticating said response signal by means of said mobile communication equipment, using said authenticating algorithm and said reference data, thereby producing an authentication result; and generating an output signal representative of said authentication result.

2. A method according to claim 1, wherein the energy for detecting the response is supplied by the said authenticity data captor.

3. A method according to claim 1, wherein said detected response signal also comprises information, which is embodied by said physical characteristics and readable accordingly.

* * * * *